No. 614,646. Patented Nov. 22, 1898.
W. H. CLOUD.
MEASURING VESSEL.
(Application filed Jan. 18, 1898.)
(No Model.)
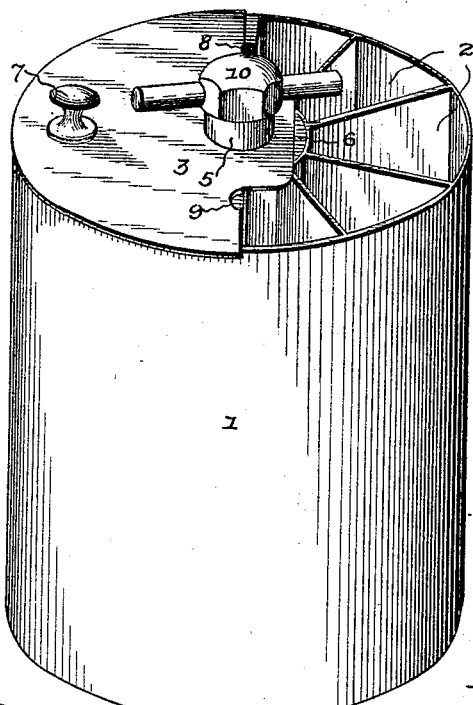
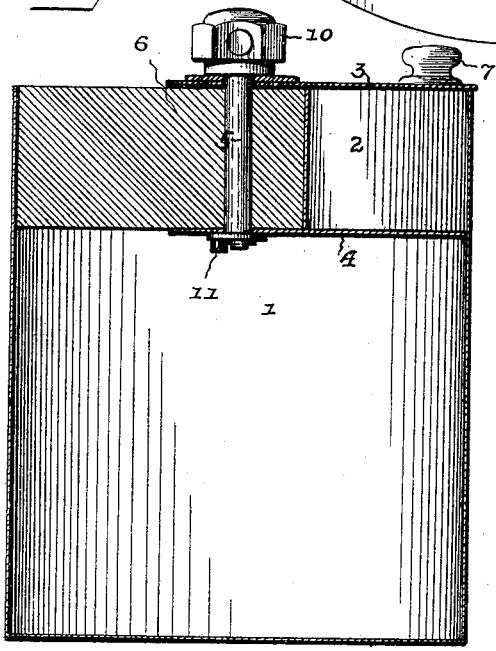
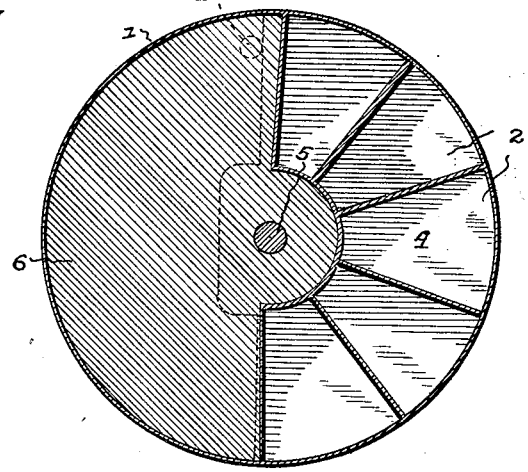
Witnesses
C. J. Young
H. J. Riley
William H. Cloud,
Inventor:-
By his Attorneys,
C. A. Snow & Co.
THE NORRIS PETERS CO., PHOTO-LITHO., WASHINGTON, D. C.

UNITED STATES PATENT OFFICE.

WILLIAM H. CLOUD, OF KOKOMO, INDIANA, ASSIGNOR OF ONE-HALF TO CARRIE M. STYER, OF SAME PLACE.

MEASURING VESSEL.

SPECIFICATION forming part of Letters Patent No. 614,646, dated November 22, 1898.

Application filed January 18, 1898. Serial No. 667,054. (No model.)

*To all whom it may concern:*

Be it known that I, WILLIAM H. CLOUD, a citizen of the United States, residing at Kokomo, in the county of Howard and State of Indiana, have invented a new and useful Measuring Vessel, of which the following is a specification.

The invention relates to improvements in measuring vessels.

The object of the present invention is to improve the construction of measuring vessels and to provide a simple, inexpensive, and efficient one adapted for coffee, baking-powder, tea, and various other materials or substances and capable of enabling the same to be accurately measured without employing a spoon or other separate measuring device.

The invention consists in the construction and novel combination and arrangement of parts, as hereinafter fully described, illustrated in the accompanying drawings, and pointed out in the claims hereto appended.

In the drawings, Figure 1 is a perspective view of a measuring vessel constructed in accordance with this invention, the upper pivoted cut-off being open for exposing the measuring-compartments. Fig. 2 is a horizontal sectional view. Fig. 3 is a vertical sectional view.

Like numerals of reference designate corresponding parts in the several figures of the drawings.

1 designates a cylindrical vessel constructed of sheet metal or other suitable material and provided at its top with a plurality of measuring-compartments 2, arranged in a curved series at one side of the vessel, and the top is closed at the other side. The compartments, which are formed by radial partitions, may be of any desired size, and when the vessel is employed for holding coffee each compartment is designed to contain a sufficient amount of coffee for making one cup of the beverage, and in order to enable the quantity of coffee to be measured by cups upper and lower cut-offs 3 and 4 are provided. The cut-offs, which are substantially semicircular or segmental, are adapted to be rotated to expose the desired number of measuring-compartments, and the lower cut-off is mounted upon a vertical stem 5, which passes through the solid or closed portion 6 of the top of the vessel, and is provided at its top with a knob or handle, so that the lower cut-off may be conveniently adjusted.

The stem of the lower cut-off forms the pivot of the upper cut-off, which is provided with a suitable handle 7. The movement of the upper cut-off is limited by a stop 8, located at one end of the closed or solid portion of the top of the vessel, and the upper cut-off is provided at its ends with recesses or notches 9 to receive the stop and permit it to cover and uncover the compartments completely. The lower cut-off, which is operated by the knob or handle 10, has its movement limited by a stop 11, located at one end of the solid portion 6.

In manipulating the measuring device the lower cut-off is first adjusted to expose the desired number of compartments, after which the upper cut-off is closed. The vessel is then inverted to fill the exposed compartments, and the inner or lower cut-off is then entirely closed to confine the material in the compartments. The material is then emptied from the compartments by opening the upper cut-off and inverting the vessel. By this construction the desired amount of the contents of the vessel may be accurately and conveniently obtained without liability of spilling the material.

The invention has the following advantages: The measuring vessel, which is exceedingly simple and inexpensive in construction, is adapted to enable its contents to be quickly and accurately measured without the use of a spoon or similar device, and in manipulating the vessel for filling one or more of the compartments there is no liability of spilling its contents.

Changes in the form, proportion, and minor details of construction may be resorted to without departing from the spirit or sacrificing any of the advantages of this invention.

What I claim is—

1. In a device of the class described, the combination of a vessel provided at its top with a plurality of stationary measuring-compartments and having the other portion of its top closed, an inner or lower cut-off arranged on the inner face of the top and provided with a stem extending upward through the same and having an exterior handle, whereby the inner cut-off is operated to cover and uncover the compartments, and an exterior or upper cut-off pivotally mounted on the stem of the lower or inner cut-off and provided with a suitable handle, the said outer or upper cut-off being capable of operation independently of the inner or lower cut-off to cover and uncover the measuring-compartments, substantially as described.

2. In a device of the class described, the combination of a measuring vessel provided at its top with a series of measuring-compartments and having the other portion of its top closed, the lower cut-off arranged on the inner face of the top, and provided with a stem extending upward through the same and having an exterior handle, whereby the cut-off is operated to cover and uncover the measuring-compartments, a stop mounted on the inner face of the top of the vessel and arranged to be engaged by the lower cut-off, an upper cut-off pivotally mounted on the stem of the lower cut-off and provided with a handle and adapted to be operated independently of the said lower cut-off, said upper cut-off being provided at one edge with a notch 9, and a projection extending from the upper face of the top of the vessel and adapted to be received within the notch 9, substantially as described.

In testimony that I claim the foregoing as my own I have hereto affixed my signature in the presence of two witnesses.

WILLIAM H. CLOUD.

Witnesses:
 D. C. SPRAKER,
 C. E. MIDDLETON.